Dec. 15, 1925.  
A. R. HYATT  
LUGGAGE CARRIER FOR AUTOMOBILES  
Filed Aug. 7, 1924  
1,566,092
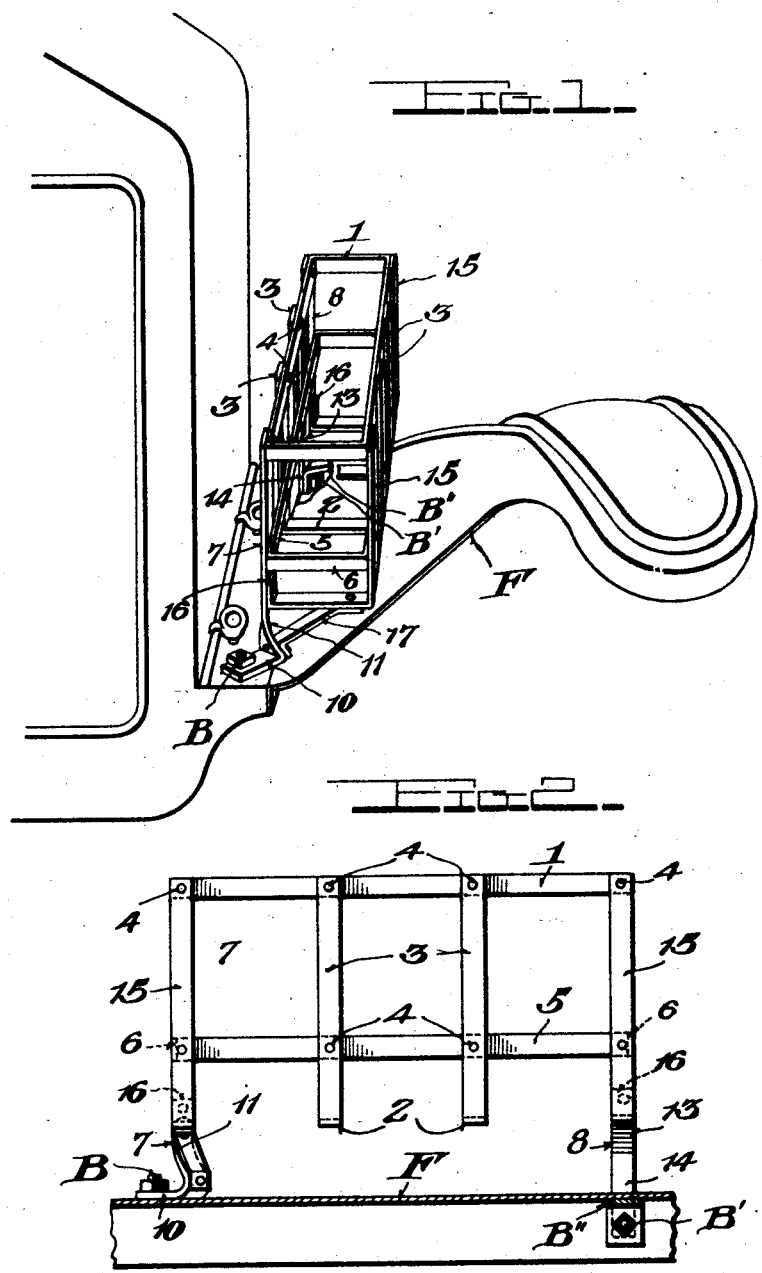

Patented Dec. 15, 1925.

1,566,092

UNITED STATES PATENT OFFICE.

ALBERT R. HYATT, OF BERESFORD, SOUTH DAKOTA.

LUGGAGE CARRIER FOR AUTOMOBILES.

Application filed August 7, 1924. Serial No. 730,616.

*To all whom it may concern:*

Be it known that I, ALBERT R. HYATT, a citizen of the United States, residing at Beresford, in the county of Lincoln and State of South Dakota, have invented certain new and useful Improvements in Luggage Carriers for Automobiles, of which the following is a specification.

This invention relates to certain new and useful improvements in luggage carriers for automobiles and the primary object thereof is to provide a carrier which is disposed between the front fender and the adjacent hood side and which also acts to brace the fender so as to hold same rigid and against rattling.

A further object of the invention is to provide a luggage carrier which may be fastened in position by means of the usual bolts of the frame.

A still further object of the invention is to provide a carrier of this type which can be economically produced and which is of simple construction devoid of moving parts.

The invention has still further and other objects which will be later set forth and manifested in the course of the following description.

In the drawings:—

Fig. 1 is a fragmentary perspective view of a side of an automobile showing the present invention applied thereto; and Fig. 2, is a front elevation, showing the adjacent parts of the automobile frame in section.

In proceeding in accordance with the present invention, the carrier is preferably constructed of skeleton form, for which purpose strap iron or steel or other material is employed in fabricating the carrier. The carrier is preferably of rectangular construction and embodies a top 1, and series of intermediate U-shaped members, the bases 2 of which form part of the bottom and the vertical arms 3 of which form parts of the opposed sides of the carrier, the upper free ends of the arms 3 being riveted or otherwise suitably secured at 4 to the top 1. An intermediate horizontal rectangular strengthening or bracing member 5 is secured to the arms 3 and has its ends 6 forming parts of the ends for the carrier.

For the purpose of fastening the carrier in position a pair of vertical uprights or arms 7 and 8 are employed and which are rigidly connected to the inner sides of the top 1 and member 5 at the ends thereof. The arm 7 is bent outwardly to form an attaching foot 10 which latter seats on the horizontal part F of the frame of the automobile at one side of the radiator. The foot 10 is perforated to receive the bolt B which latter is a part of the equipment of a Ford automobile and secures the radiator to the frame. The part of the upright adjacent to the foot, is twisted at 11 so as to extend forwardly to receive the bolt B, which twisting acts to also increase the rigidity of the upright. The other upright 8 extends vertically but has its lower end offset at 13 to form a foot 14 which is perforated to receive a bolt B' which forms a part of the frame, the foot 14 extending downwardly and being engaged between the frame and the usual fender brace B'' of the Ford car.

The bottom of the outerside of the carrier seats on the fender and consequently serves to brace the fender.

The uprights 7 and 8 form a part of the inner side of the carrier, the opposite side parts of which are formed by members 15 of somewhat J-shape, the lower ends of the latter being extended upwardly at 16 and riveted to the respective uprights. A diagonal brace 17 is secured to the bottom of the front of the J-shaped member 15 and to the heel of the foot 10.

Although the invention is shown and described as applied to a Ford automobile, it will be understood that same can be adapted to other makes of cars, and if desired or found necessary, special holes may be drilled to receive bolts other than those inherent to the car, in order to attach the carrier.

What is claimed is:—

1. An automobile luggage carrier including a body, a pair of side-forming uprights carried by the body on the inner side and at the ends thereof, one of the uprights having a horizontal foot perforated to receive a bolt on the frame of the automobile and said upright being twisted adjacent to the foot to cause the latter to lie at an angle to the plane of the upright, the other upright being offset adjacent its lower end to form a vertical foot which latter projects downwardly between the frame and the fender of the automobile and is perforated to receive one of the frame bolts, the outer side of the bottom of the body seating on the fender, J-shaped side and bottom-forming members opposite to the uprights and having their lower ends secured to the uprights and a diagonal brace secured to the heel of the foot and to the bottom of the adjacent J-shaped member.

2. An automobile luggage carrier including a body, a pair of side-forming uprights carried by the body on the inner side and at the ends thereof, one of the uprights having a horizontal foot perforated to receive a bolt on the frame of the automobile, the other upright having a depending foot formed to engage between the frame and fender and being perforated to receive one of the frame bolts, the outer side of the bottom of the body seating on the fender, and side and bottom-forming parts opposite to the uprights.

3. An automobile luggage carrier, including a substantially rectangular open top and a substantially rectangular open intermediate member, intermediate vertical U-shaped members connected to the said first named members, end uprights at one side of the said top and intermediate members and secured to each, attaching means carried by the uprights, and substantially J-shaped end members secured to the other sides of the top and intermediate members and having their lower parts secured to the respective uprights.

4. An automobile luggage carrier including a body formed to be disposed in the space between a side of the hood and the adjacent fender and having a bottom with the outer side of the latter formed to seat on the fender, supports connected to the body and projecting below the bottom thereof to hold the inner side of the bottom, and means to secure the supports in position, said supports and the inner side of the body being disposed in such spaced relation to said side of the hood to permit the latter to be opened and closed without disturbing the carrier.

In testimony whereof I affix my signature.

ALBERT R. HYATT